Aug. 27, 1935.  C. E. PADEN  2,012,635
DRIVE ON TIRE JACK
Filed June 7, 1934  2 Sheets—Sheet 1

Inventor
Charles E. Paden

By Bacon & Thomas
Attorneys

Aug. 27, 1935.  C. E. PADEN  2,012,635
DRIVE ON TIRE JACK
Filed June 7, 1934  2 Sheets-Sheet 2
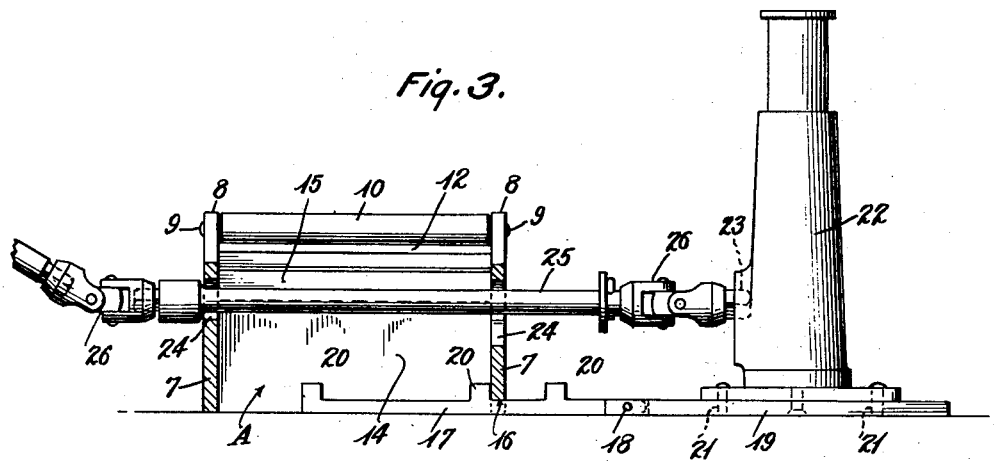
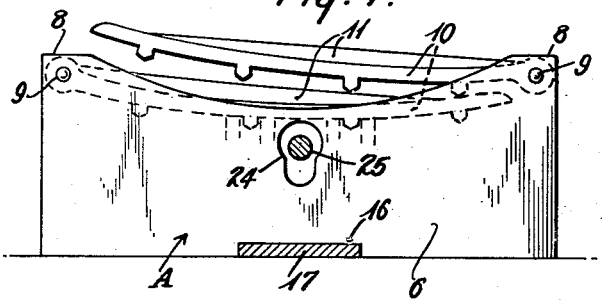
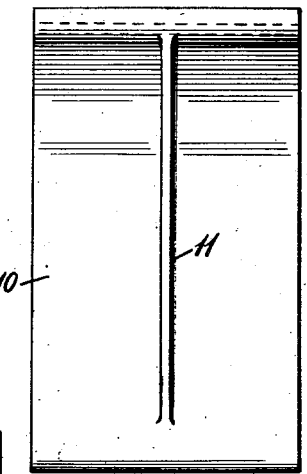
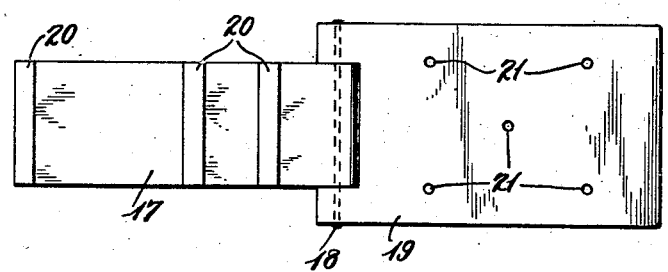
Inventor
Charles E. Paden
By Bacon & Thomas
Attorneys

UNITED STATES PATENT OFFICE 2,012,635

DRIVE ON TIRE JACK

Charles E. Paden, Pittsburgh, Pa., assignor of one-third to Edwin John Dettling, Mount Lebanon, Pa., and one-third to James Clayton, Dormont, Pa.

Application June 7, 1934, Serial No. 729,483

4 Claims. (Cl. 254—88)

This invention relates to new and useful improvements in drive on tire jacks.

The primary object of this invention is to provide a device for jacking up a vehicle wheel to permit changing of tires, said device being designed to have the wheel driven onto the same whereby the wheel supporting axle will be placed in alignment with the lifting portion of the jack device.

A further object of the invention is to provide a jack device of the above mentioned type which may be disassembled and collapsed to permit the same to be stored in a relatively small space.

Other objects and advantages of the invention will be apparent during the course of the following description.

In the accompanying drawings forming a part of this specification, and in which like numerals are employed to designate like parts through the same, Figure 1 is a perspective view of the structure embodying this invention;

Figure 3 is a partly vertical sectional view and partly side elevational view;

Figure 4 is a side elevational view of the cradle with the drive-on ramps collapsed;

Figure 5 is a detailed plan view of one of the ramp structures; and

Figure 6 is a detailed plan view of the jack mounting.

Figure 1:
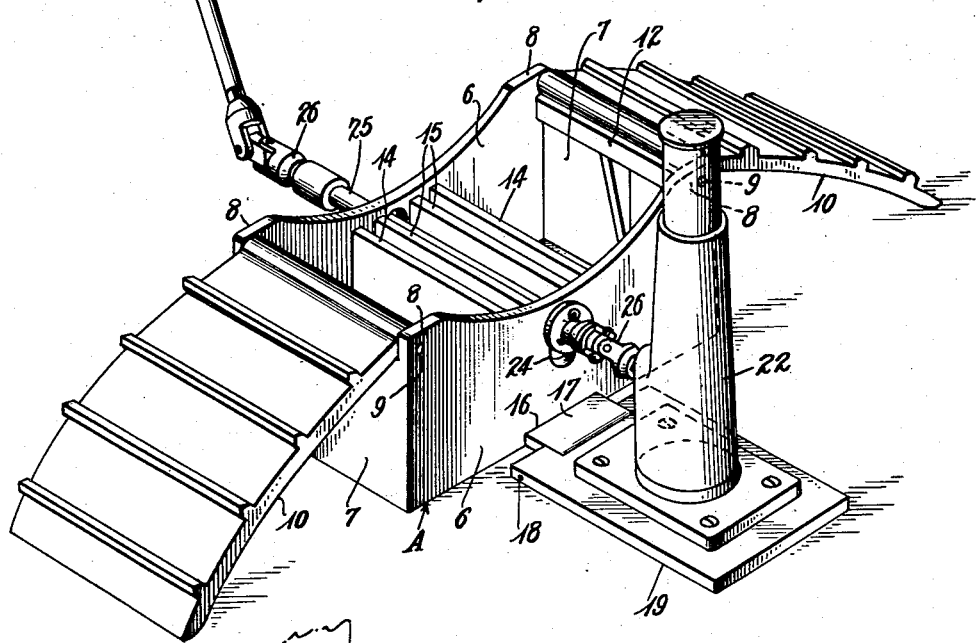
Figure 2:
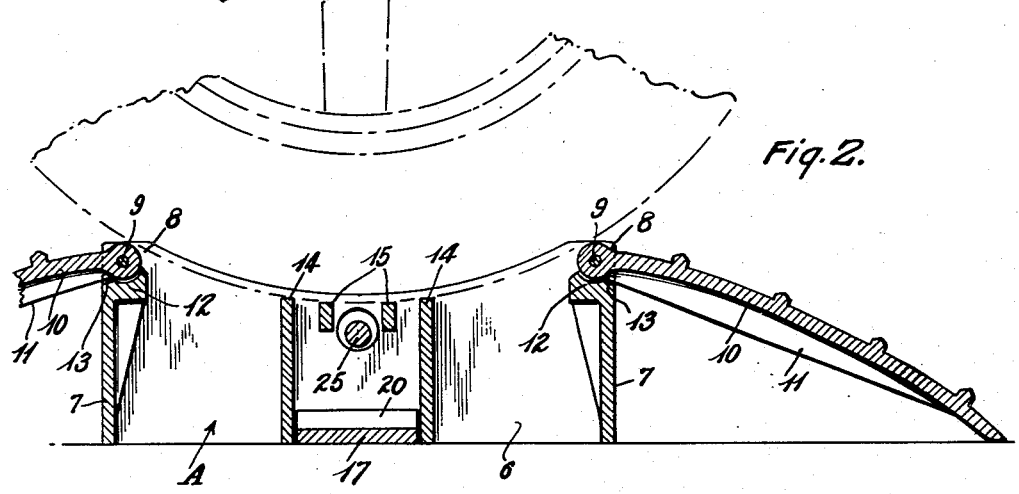
Figure 2 is a vertical sectional view.

In the drawings, wherein for the purpose of illustration is shown the preferred embodiment of this invention, the reference character A designates in its entirety the box-like wheel supporting cradle which is formed of side walls 6 and end walls 7. It will be noted that the top edges of the side walls 6 are slightly curved to cause the same to correspond substantially with the curvature of a vehicle wheel. The end walls 7 are illustrated as being of less height than the height of the ends of the side walls whereby the upper corners of the side walls form ears 8 for the reception of pivot pins 9. These pivot pins function to connect to the opposite ends of the box-like cradle A the longitudinally curved ramps 10. These ramps are curved longitudinally to provide greater strength and are formed on their concave sides with longitudinally extending reinforcing ribs 11. The top surfaces of the ramps 10 may be roughened in any desired manner or improved traction may be provided by forming raised ribs on these top surfaces. Still a further way of improving the traction surfaces of the ramps is by forming thereon raised letters which will spell the trade-mark or other identifying indicia of the manufacturer. For the purpose of assisting in journalling the inner, pivoted ends of the ramps 10, trough-like members 12 may be associated with the upper edges of the end walls 7. Each trough-like member 12 may be notched at 13 to receive the reinforcing rib 11 of the associated ramp.

Extending transversely of the cradle A and arranged within the same to be connected at its ends to the side walls 6 are the parallel partition plates 14. Interposed between these partition plates and extending in parallelism with respect to the same are bars 15. The partition plates 14 and the bars 15 function as supporting elements for a wheel when it is driven onto the cradle over either one of the ramps 10. It will be seen from the drawings that the partition plates 14 extend substantially the full height of the side walls 6 at the intermediate portions of the latter. The bars 15 are positioned at the upper edges of the side wall 6 and are comparatively narrow. One side wall 6 is cut away at 16 to form an opening in the bottom edge of the wall and in transverse alignment with the space between the partition plates 14.

This opening is designed to receive the connecting bar 17 which is pivotally attached at 18 to a base plate 19. The connecting bar 17 is formed with a series of stops 20 which are spaced at suitable intervals along the length of the bar 17. The base 19 is formed with a suitable number of apertures 21 designed to receive bolts which are employed for securing an axle engaging wheel lifting jack 22. By means of the stops 20, the connecting bar 17 may be positioned within the opening or cut-away portion 16 in the side wall of the cradle so that any desired one of the stops 20 will engage the inner marginal edge of this opening. These stops, therefore, will permit the jack 22, mounted on the base 19, to be arranged at different distances from the cradle A. The adjustability of the jack relative to the cradle is desirable to enable the jack to be positioned so that it will not interfere with the spring or any other structural feature associated with the axle.

The jack 22 may be of any desired design, such as a screw-jack. All conventional vehicle jacks are provided with coupling sockets, or the like 23 adapted to have connected thereto an operating crank. The side walls 6 of the cradle are provided with apertures 24 which are arranged in alignment with the socket 23 of the jack. These apertures 24 are intended to receive an operating rod 25. Each end of the rod 25 is provided with a coupling unit 26 which preferably includes a universal joint. One of these couplings 26 is designed to fit the socket 23 of the jack. The remaining coupling 28 is designed for connection with the operating crank which is supplied with the conventional jack mounted on the base 19. It will be understood that the rod 25 is of sufficient length to extend from the socket 23 of the jack through the apertures 24 and to project beyond the far side of the cradle A a sufficient distance to take care of the three different possible positions of adjustment of the jack relative to the cradle. If desired, the rod 25 may be of such a design as to be extensible to accommodate adjustments of the jack relative to the cradle.

The manner of using this drive on tire jack will be described as follows. With all of the elements arranged in the manner illustrated in Fig. 1, the vehicle wheel to be worked upon is driven onto the cradle A over either one of the ramps 10. When the wheel rests on the partition plates 14 and the supporting bars 15, the axle of the wheel will be aligned with the jack 22. To raise the wheel off of the cradle A, the operator will actuate the jack by means of the rod 25 and the conventional jack operating crank. After the intended work has been performed on the wheel, such as the changing of the tire, the jack may be operated to lower the wheel onto the cradle and the wheel then may be moved off of the cradle over either one of the ramps 10. After the device has served its purpose and the operator desires to store the same under the seat of the vehicle, or in any other suitable place, the connecting bar 17 is withdrawn from the cradle A and pivoted about the point 18 to cause the connecting bar to rest against the jack 22. The ramps 10 then may be folded onto the cradle A. The entire device then will be collapsed into two comparatively small objects which may be readily stored.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a device of the character described, a wheel supporting cradle, an inclined ramp pivotally connected to one end of the cradle for movement between an operative position projecting from said cradle and an inoperative position overlying the cradle, a jack supporting base connected to one side of said cradle, a jack mounted on said base, and an operating rod extending through said cradle for connection at one end with the jack and for connection at its other end with a jack operating crank.

2. In a device of the character described, a wheel supporting cradle, an inclined ramp pivotally connected to each end of the cradle, a jack supporting base, a connector bar attached to said base, means for adjustably connecting the bar to one side of the cradle to permit the base to be located at different distances from the cradle, a jack mounted on said base, and an operating rod extending through said cradle for connection at one end with the jack and for connection at its other end with a jack operating crank.

3. In a device of the character described, a box-like wheel supporting cradle having side and end walls and a pair of transverse partition plates connected at their ends to the side walls, one side wall being cut away at its lower edge and between said partition plates, an inclined ramp connected to one end of the cradle, a jack supporting base, a connector bar attached to said base and extending into said cradle through the cut-away edge of its side wall, and a jack mounted on said base.

4. In a device of the character described, a box-like wheel supporting cradle having side and end walls and a pair of transverse partition plates connected at their ends to the side walls, one side wall being cut away at its lower edge and between said partition plates, an inclined ramp connected to one end of the cradle, a jack supporting base, a connector bar attached to said base and extending into said cradle through the cut-away edge of its side wall, a plurality of stops carried by said bar at spaced points whereby the bar may be arranged in different positions relative to said cradle and held against withdrawal by engagement of a stop with the margin of said cut-away edge, and a jack mounted on said base.

CHARLES E. PADEN.